United States Patent
Shimazu (10) Patent No.: US 9,819,816 B2
(45) Date of Patent: Nov. 14, 2017

(54) IMAGE FORMING APPARATUS, IMAGE FORMING METHOD, AND TRANSLATION SYSTEM

(71) Applicant: Saeko Shimazu, Kanagawa (JP)

(72) Inventor: Saeko Shimazu, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 11 days.

(21) Appl. No.: 14/884,924

(22) Filed: Oct. 16, 2015

(65) Prior Publication Data

US 2016/0127578 A1  May 5, 2016

(30) Foreign Application Priority Data

Oct. 31, 2014  (JP) .................................. 2014-223125

(51) Int. Cl.
G06F 17/28 (2006.01)
H04N 1/00 (2006.01)
G06F 3/12 (2006.01)

(52) U.S. Cl.
CPC ....... *H04N 1/00244* (2013.01); *G06F 3/1259* (2013.01); *G06F 3/1294* (2013.01); *H04N 1/0083* (2013.01); *H04N 1/00209* (2013.01); H04N 2201/0094 (2013.01)

(58) Field of Classification Search
CPC ............ H04N 1/00209; H04N 1/00244; G06F 3/1259; G06F 17/28; G06F 17/289; G06F 17/2836; G06F 17/2863
USPC ........................ 358/1.15, 1.11; 709/202, 205
See application file for complete search history.

(56) References Cited

U.S. PATENT DOCUMENTS

| 5,430,832 A * | 7/1995 | Imaizumi ............. H04N 1/3875 345/620 |
| 7,734,458 B1 * | 6/2010 | Eguchi .................. G06F 17/289 704/2 |
| 2006/0077411 A1 * | 4/2006 | Mathieson ............ G06F 17/289 358/1.13 |

(Continued)

FOREIGN PATENT DOCUMENTS

JP  2001-338232  12/2001

*Primary Examiner* — Jamares Q Washington
(74) *Attorney, Agent, or Firm* — Harness, Dickey & Pierce P.L.C.

(57) ABSTRACT

An image forming apparatus connected over a network to an information processing apparatus, which translates source text information to be translated, includes a reading unit, a transmitter, and an output unit. The reading unit reads image information from an original document. The transmitter transmits partial image information read from a part of the original to the information processing apparatus at a point in time when the partial image information has been read. The receiver receives, from the information processing apparatus, partial translated information obtained by translating source text information contained in the partial image information. The output unit outputs the received partial translated information. The reading unit reads the image information from the original even while the partial image information is transmitted to the information processing apparatus. When the reading unit has completed reading the image information, the transmitter transmits the reading-completed image information to the information processing apparatus.

20 Claims, 8 Drawing Sheets (56) References Cited

U.S. PATENT DOCUMENTS

2006/0110171 A1* 5/2006 Miyazawa ......... H04N 1/00209
399/8
2009/0271175 A1* 10/2009 Bodin .................... G10L 13/00
704/2
2010/0328685 A1* 12/2010 Enomoto ................. G06K 9/03
358/1.2

* cited by examiner

USER INFORMATION

| Corporate ID | User ID | Password | e-mail Address | User Name | Access Role | Expiration Date |
|---|---|---|---|---|---|---|
| A000101 | yoshida | ******** | yoshida@example.com | Yoshida | Administrator | 2010-10-01 |
| | tanaka | ******** | tanaka@example.com | Tanaka | User | 2010-10-01 |
| | suzuki | ******** | suzuki@example.com | Suzuki | User | 2010-10-01 |
| | satoh | ******** | satoh@example.com | Satoh | User | 2010-10-01 |
| | takahashi | ******** | takahashi@example.com | Takahashi | User | 2010-10-01 |

IMAGE FORMING APPARATUS, IMAGE FORMING METHOD, AND TRANSLATION SYSTEM

CROSS-REFERENCE TO RELATED APPLICATIONS

The present application claims priority to and incorporates by reference the entire contents of Japanese Patent Application No. 2014-223125 filed in Japan on Oct. 31, 2014.

BACKGROUND OF THE INVENTION

1. Field of the Invention

The present invention relates generally to image forming apparatuses, image forming methods, and translation systems.

2. Description of the Related Art

Embedded systems are increasing in functionality in recent years. Application software utilizing such functionality is vigorously developed also for image forming apparatuses such as a multifunction peripheral having, e.g., a facsimile function, a scanner function, a printer function, and a copier function.

For example, application software for machine-translating paper document from one language into another by reading the paper document (original document) using an image forming apparatus to obtain image information, performing character recognition on the image information, and translating recognized characters to the translation target language is already implemented. An example of such application software is disclosed in Japanese Laid-open Patent Publication No. 2001-338232.

Therefore, there is a need for an image forming apparatus, an image forming method, and a translation system, which enables quality check of a result of in-progress translation.

SUMMARY OF THE INVENTION

It is an object of the present invention to at least partially solve the problems in the conventional technology.

According to example embodiment of the present invention, there is provided an image forming apparatus connected over a network to an information processing apparatus, the information processing apparatus being configured to perform a translation process of translating source text information to be translated, the image forming apparatus comprising: a reading unit that reads image information from an original document; a transmitter that transmits partial image information read from a part of the original document to the information processing apparatus at a point in time when the partial image information has been read; a receiver that receives, from the information processing apparatus, partial translated information obtained by translating source text information contained in the partial image information; and an output unit that outputs the received partial translated information, wherein, the reading unit reads the image information from the original document even while the partial image information is transmitted to the information processing apparatus, and when the reading unit has completed reading the image information from the original, the transmitter transmits the reading-completed image information to the information processing apparatus.

Example embodiments of the present invention also provide an image forming method to be performed by an image forming apparatus connected over a network to an information processing apparatus, the information processing apparatus being configured to translate source text information to be translated, the image forming method comprising: reading image information from an original document; transmitting partial image information read from a part of the original document to the information processing apparatus at a point in time when the partial image information has been read; receiving, from the information processing apparatus, partial translated information obtained by translating source text information contained in the partial image information; and outputting the received partial translated information, wherein, at the reading, the image information is read from the original document even while the partial image information is transmitted to the information processing apparatus, and at the transmitting, when reading the image information from the original is completed, the reading-completed image information is transmitted to the information processing apparatus.

Example embodiments of the present invention also provide a translation system comprising: an information processing apparatus; and an image forming apparatus connected to the information processing apparatus over a network, the image forming apparatus including a reading unit that reads image information from an original document, and a transmitter that transmits partial image information read from a part of the original document to the information processing apparatus at a point in time when the partial image information has been read, the information processing apparatus including a communication control unit that receives the partial image information from the image forming apparatus, and a translation processing unit that performs a translation process on source text information to be translated, the source text information being contained in the partial image information, thereby creating partial translated information, the communication control unit transmitting the created partial translated information to the image forming apparatus, the image forming apparatus further including a receiver that receives the partial translated information from the information processing apparatus, and an output unit that outputs the received partial translated information, the reading unit reading the image information from the original document even while the partial image information is transmitted to the information processing apparatus, and when the reading unit has completed reading the image information from the original, the transmitter transmitting the reading-completed image information to the information processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
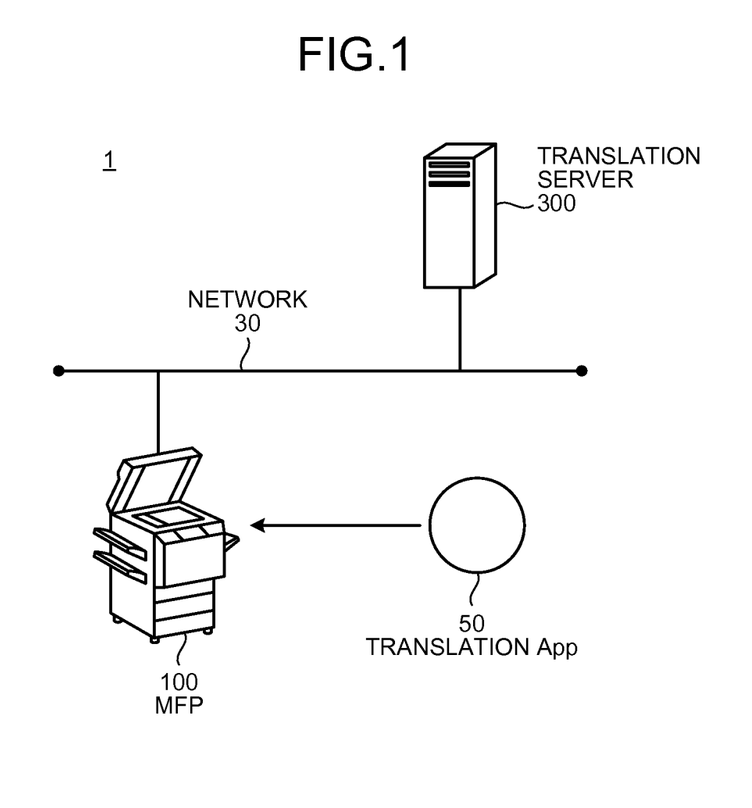
FIG. 1 is a diagram illustrating an example of configuration of a translation system according to an embodiment of the present invention.

Embodiments of an image forming apparatus, an image forming method, and a translation system according to the present invention are described in detail below with reference to the accompanying drawings. FIG. 1 is a diagram illustrating an example of configuration of a translation system 1 according to an embodiment. As illustrated in FIG. 1, the translation system 1 according to the present embodiment includes an MFP (multifunction peripheral) 100 and a translation server 300 and provides a service (translation service) of performing a translation process on a text described in an original document (hereinafter, "original"). The MFP 100 and the translation server 300 are mutually connected over a network 30.

The MFP 100 is an apparatus (image forming apparatus) having various functions including, for example, a copier function, a scanner function, a facsimile function, and a printer function. Translation application software (hereinafter, "translation App") 50 is installed on the MFP 100. The translation App 50 is software providing a function of translating characters described in an original to a translation target language by utilizing functionality of the MFP 100. In the present embodiment, the translation App 50 is application software of a type to be installed on the MFP 100. Alternatively, the translation App 50 may be a Web App, which can be operated from the MFP 100 via browser application software. The MFP 100 reads image information from an original to be translated and transmits the image information to the translation server 300, which performs a translation process.

The translation server 300 performs a character recognition process on the image information received from the MFP 100 and obtains source text information (which is a text to be translated) from a result of the character recognition process. The translation server 300 performs the translation process of translating the obtained source text information and transmits a file (translation result file) containing translated information obtained by translating the source text information to the MFP 100. Thereafter, the MFP 100 outputs (by, for example, displaying or printing) the translated information. The output translated information is checked by a user. The translation server 300 performs not only the translation process but also management of information about users (user information) who use the translation service.

Figure 2:
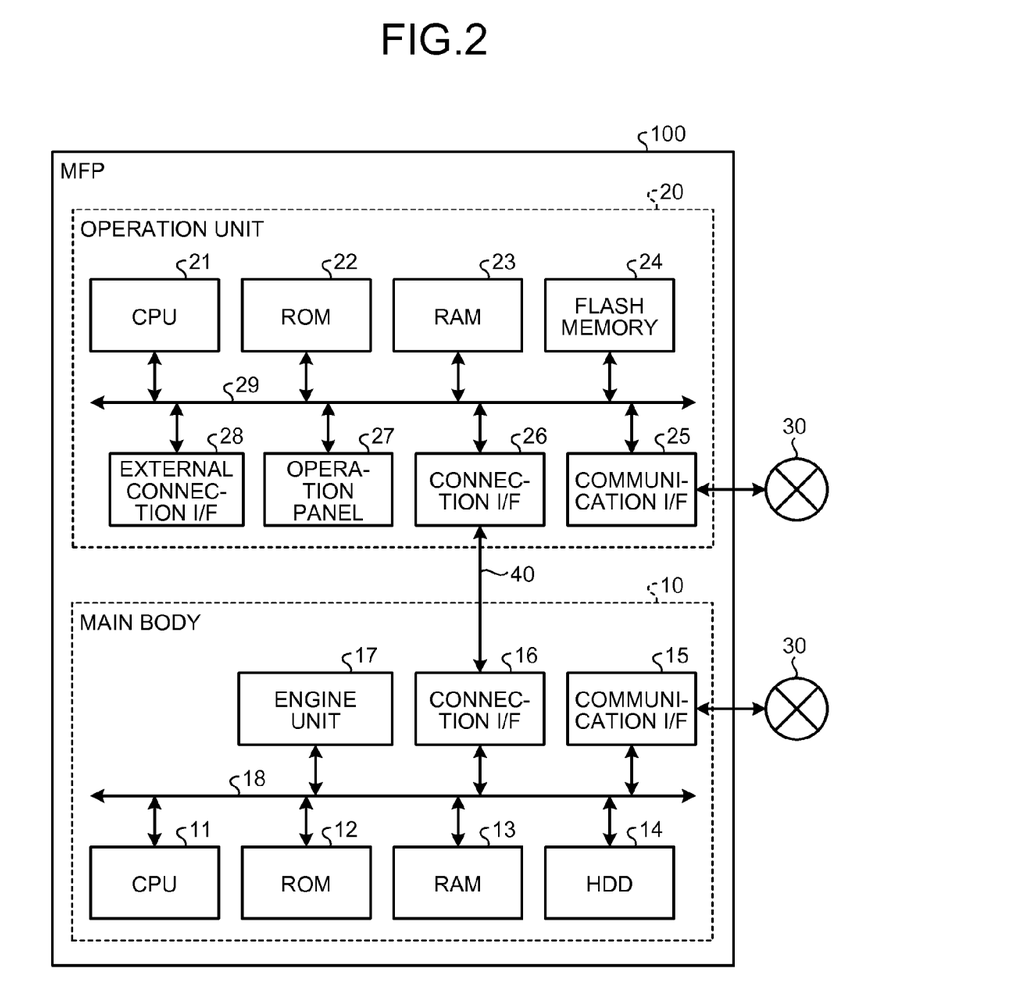
FIG. 2 is a diagram illustrating an example of hardware structure of a multifunction peripheral (MFP) according to the embodiment.

A hardware structure of the MFP 100 is described below. FIG. 2 is a diagram illustrating an example of the hardware structure of the MFP according to the embodiment. As illustrated in FIG. 2, the MFP 100 includes a main body 10 capable of providing various functions including, for example, the copier function, the scanner function, the facsimile function, and the printer function and an operation unit 20 for accepting operation input from a user.

Note that "accepting operation input from a user" indicates a concept including accepting information (including a signal representing screen coordinates) entered by user operation. The main body 10 and the operation unit 20 are communicably connected to each other via a communication channel 40 dedicated thereto. A communication channel compliant to a desired standard, which may be either for wired or wireless communication, can be used as the communication channel 40. For example, but not limited thereto, a communication channel compliant to a USB (universal serial bus) standard can be used as the communication channel 40.

The main body 10 can perform operation in accordance with the operation input accepted by the operation unit 20. Furthermore, the main body 10 is communicable also with external equipment such as a client PC (personal computer) and can perform operation in accordance with an instruction received from the external equipment.

An example hardware structure of the main body 10 is described below. As illustrated in FIG. 2, the main body 10 includes a CPU (central processing unit) 11, a ROM (read only memory) 12, a RAM (random access memory) 13, an HDD (hard disk drive) 14, a communication I/F (interface) 15, a connection I/F 16, and an engine unit 17, which are mutually connected via a system bus 18.

The CPU 11 provides overall control of operations of the main body 10. More specifically, the CPU 11 provides overall control of operations of the main body 10 by executing program instructions (hereinafter, "program") stored in the ROM 12, the HDD 14, or the like while using the RAM 13 as a work area, thereby implementing the above-described various functions including, for example, the copier function, the scanner function, the facsimile function, and the printer function.

The communication I/F 15 is an interface for connection to the network 30. The connection I/F 16 is an interface for communication with the operation unit 20 via the communication channel 40.

The engine unit 17 is hardware that performs general information processing and processing, other than the communication, for implementing the copier function, the scanner function, the facsimile function, and the printer function. For example, the engine unit 17 may include a scanner (image reading unit), which reads an image of an original by scanning the original, a plotter (image forming unit), which performs printing on a recording medium such as paper, and a facsimile unit, which carries out facsimile communication. The engine unit 17 may further include certain optional units such as a finisher, which sorts printed recording medium sheets, and an ADF (automatic document feeder), which automatically feeds an original.

An example hardware structure of the operation unit 20 is described below. As illustrated in FIG. 2, the operation unit 20 includes a CPU 21, a ROM 22, a RAM 23, a flash memory 24, a communication I/F 25, a connection I/F 26, an operation panel 27, and an external connection I/F 28, which are mutually connected via a system bus 29.

The CPU 21 provides overall control of operations of the operation unit 20. More specifically, the CPU 21 provides overall control of operations of the operation unit 20 by executing program stored in the ROM 22, the flash memory 24, or the like while using the RAM 23 as a work area, thereby implementing various functions, which will be described later, including displaying information (image) in accordance with input accepted from a user.

The communication I/F 25 is an interface for connection to the network 30. The connection I/F 26 is an interface for communication with the main body 10 via the communication channel 40. The external connection I/F 28 is an interface for connection to an IC card reader or the like.

The operation panel 27 accepts various inputs generated by user operations and displays various information (including, for example, information responsive to accepted operation input, information indicative of an operating status of the MFP 100, and information indicative of current settings). In this example, the operation panel 27 is configured by an LCD (liquid crystal display) having touch panel functionality. However, the operation panel 27 is not limited thereto. For example, the operation panel 27 may be configured by an organic electro-luminescent display having touch panel functionality. The operation panel 27 may include, in addition to or in lieu of the display, an operation unit (e.g., a hardware key) and/or an indicator (e.g., a lamp). The operation panel 27 corresponds to "display unit".

Figure 3:
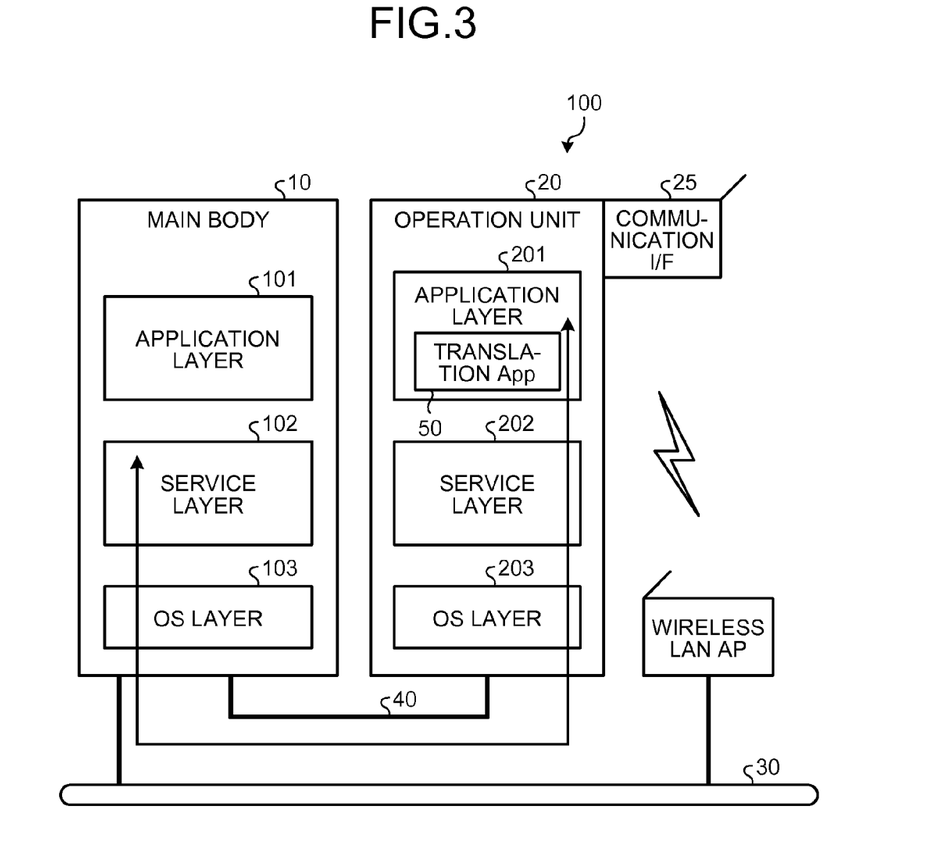
FIG. 3 is a schematic diagram illustrating an example of software architecture of the MFP according to the embodiment.

A software architecture of the MFP 100 is described below. FIG. 3 is a schematic diagram illustrating an example of the software architecture of the MFP according to the embodiment.

As illustrated in FIG. 3, the main body 10 includes an application layer 101, a service layer 102, and an OS (operating system) layer 103. The application layer 101, the service layer 102, and the OS layer 103 are implemented as a variety of software stored in the ROM 12, the HDD 14, or the like. The CPU 11 executes the variety of software, thereby providing the various functions.

The software of the application layer 101 is application software (hereinafter, sometimes simplified as "App") for providing certain functions by utilizing hardware resources. The App may include, for example, a copier App for providing the copier function, a scanner App for providing the scanner function, a facsimile App for providing the facsimile function, and a printer App for providing the printer function.

The software of the service layer 102 is software for providing an interface, which is interposed between the application layer 101 and the OS layer 103 and enables Apps to utilize the hardware resources included in the main body 10. More specifically, the software of the service layer 102 provides a function of accepting operation requests for utilizing the hardware resources and a function of arbitrating the operation requests. Operation requests to be accepted by the service layer 102 may include a request to perform reading using the scanner and a request to perform printing using the plotter.

The service layer 102 provides the interface function not only to the application layer 101 of the main body 10 but also to an application layer 201 of the operation unit 20. Accordingly, the application layer 201 (and hence Apps) of the operation unit 20 can implement functions by utilizing the hardware resources (e.g., the engine unit 17) of the main body 10 via the interface function provided by the service layer 102.

The software of the OS layer 103 is basic software (operating system) for providing basic functions for controlling the hardware included in the main body 10. The software of the service layer 102 converts a request for utilizing the hardware resources issued from one of the various Apps into a command interpretable by the OS layer 103 and passes the command to the OS layer 103. The software of the OS layer 103 executes the command, thereby causing the hardware resources to operate as requested by the App.

Similarly, the operation unit 20 includes the application layer 201, a service layer 202, and an OS layer 203. The application layer 201, the service layer 202, and the OS layer 203 included in the operation unit 20 are similar to those of the main body 10 in hierarchal architecture. However, functions provided by Apps of the application layer 201 and types of operation requests acceptable by the service layer 202 differ from those of the main body 10.

The Apps of the application layer 201 may be software for providing predetermined functions by utilizing the hardware resources included in the operation unit 20. However, the Apps of the application layer 201 are software for mainly providing a function as UI (user interface) for operations and display related to the functions (the copier function, the scanner function, the facsimile function, and the printer function) provided by the main body 10. The application layer 201 according to the present embodiment includes the translation App 50 described above. The translation App 50 will be described in detail later with reference to FIG. 4.

In the present embodiment, the software of the OS layer 103 of the main body 10 and the software of the OS layer 203 of the operation unit 20 differ from each other to maintain functional independence. More specifically, the main body 10 and the operation unit 20 operate on different operating systems independently of each other. For example, it is possible to use Linux (registered trademark) as the software of the OS layer 103 of the main body 10, while using Android (registered trademark) as the software of the OS layer 203 of the operation unit 20.

As described above, in the MFP 100 of the present embodiment, the main body 10 and the operation unit 20 operate on the different operating systems. Accordingly, communication between the main body 10 and the operation unit 20 is carried out as communication between different devices rather than as inter-process communication on a same device. For example, operation (hereinafter, "command communication") of transmitting information (i.e., an instruction given from a user) accepted by the operation unit 20 to the main body 10 and operation of transmitting, by the main body 10, a notice about an event to the operation unit 20 are carried out as the communication between different devices.

The operation unit 20 carries out the command communication with the main body 10 so that the operation unit 20 can use the functions of the main body 10. Examples of the event, about which the notice is transmitted from the main body 10 to the operation unit 20, include an operation status on the main body 10 and settings configured on the main body 10.

In the present embodiment, electric power is supplied from the main body 10 to the operation unit 20 via the communication channel 40. Accordingly, power supply to the operation unit 20 can be controlled separately from (i.e., independently of) power supply control of the main body 10.

Figure 4:
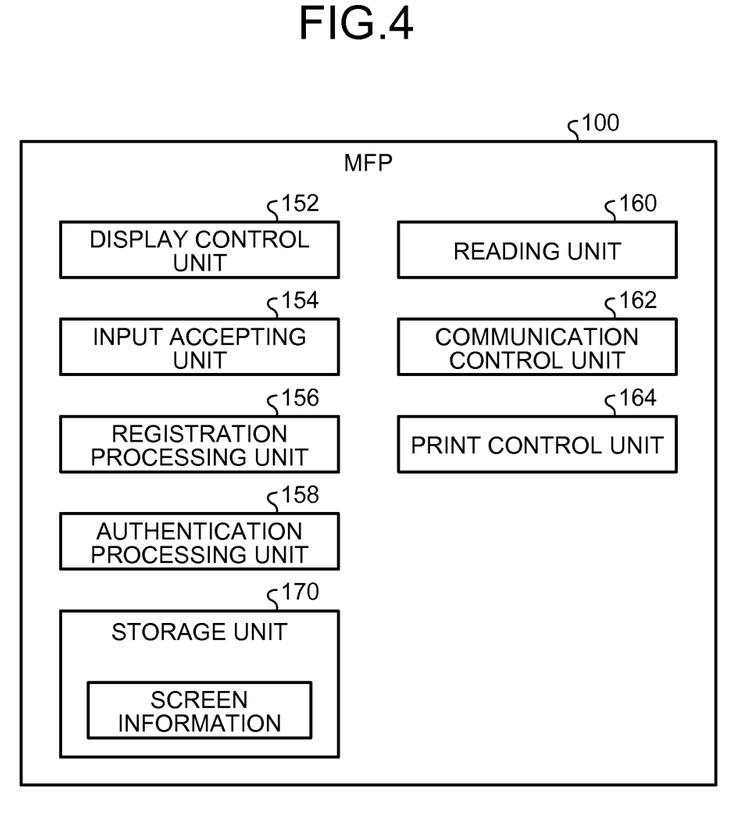
FIG. 4 is a diagram illustrating an example of functional configuration of the MFP according to the embodiment.

An example functional configuration of the MFP 100 is described below. FIG. 4 is a diagram illustrating an example of functional configuration of the MFP 100 according to the embodiment. As illustrated in FIG. 4, the MFP 100 includes a display control unit 152, an input accepting unit 154, a registration processing unit 156, an authentication processing unit 158, a reading unit 160, a communication control unit 162, a print control unit 164, and a storage unit 170. Although FIG. 4 mainly illustrates functions related to the translation App 50 for convenience of description, functions provided by the MFP 100 are not limited thereto.

The display control unit 152 provides control of displaying various screens (e.g., a settings screen) and information on the operation panel 27. More specifically, the display control unit 152 displays a user registration screen, from which a user registers himself/herself as a user in advance of using the translation service, on the operation panel 27. The display control unit 152 also displays a login screen, from which a user logs into the translation App 50 to use the translation service, on the operation panel 27.

The display control unit 152 also displays on the operation panel 27 the settings screen, from which a user can perform translation settings when using the translation service, a reading-in-progress screen indicating that reading an original is in progress, a transmission-complete screen indicating that a file containing image information has been transmitted to the translation server 300, and the like.

The display control unit 152 further displays translated information contained in a translation result file received from the translation server 300 on the operation panel 27. The display control unit 152 corresponds to "output unit".

The input accepting unit 154 provides control of accepting various operation inputs from the operation panel 27. More specifically, the input accepting unit 154 accepts input about information involved in user registration (hereinafter, sometimes referred to as "user registration information") from the user registration screen. The user registration information may include, but not limited to, user ID (identification) for identifying each user, password, e-mail address, which is a contact address, and user name.

The input accepting unit 154 also accepts input about information involved in user authentication (hereinafter, sometimes referred to as "login information") from the login screen. The login information may include, but not limited to, user ID for identifying each user and password. In the present embodiment, user authentication refers to determining whether or not the user is authorized to use the translation service.

The input accepting unit 154 also accepts input about translation settings, which are settings concerning the translation process of translating an original, from the settings screen, which is displayed when a user uses the translation service. For example, the input accepting unit 154 accepts, as the translation settings, input designating a translation source language (in which a to-be-translated text (source text) is described), a translation target language (in which a translation result is to be described), and optionally one or more dictionaries (specialized dictionaries) of a special field(s) for use in translating the source text information.

The "special field" in the present embodiment contains at least any one of a special field, a specialized field, a research field, and an academic field, to which the source text belongs. The specialized dictionary is the dictionary to be used in the translation process performed by the translation server 300. Although designation of the specialized dictionary can be omitted, selecting an appropriate specialized dictionary leads to an increase in translation accuracy. Meanwhile, selection of the specialized dictionary may be either single-choice selection or multiple-choice selection. An upper limit may be set for the number of selectable dictionaries.

When, after the input about the translation settings is accepted, a "READ START" button on the settings screen is clicked, the input accepting unit 154 accepts input representing a read instruction instructing the reading unit 160 to start an original reading process.

Furthermore, even while the reading unit 160 is reading an original, if a "CANCEL" button on the reading-in-progress screen is clicked, the input accepting unit 154 accepts input representing a cancellation instruction (break instruction) for causing the reading unit 160 to discontinue the original reading process.

The registration processing unit 156 performs a process for registering information about a user(s) (user information) who can use the translation service provided by the translation system 1 in the translation server 300. In the present embodiment, a user who desires to use the translation service performs operation for user registration from the operation unit 20. For example, when a user performs an operation (which may be clicking a registration button displayed on the operation panel 27, for example), which triggers user registration, the user registration screen is displayed on the operation panel 27. When user registration information (i.e., information involved in the user registration) is entered by the user, the registration processing unit 156 instructs the communication control unit 162 to transmit the entered user registration information to the translation server 300. Upon being instructed as such, the communication control unit 162 transmits the entered user registration information to the translation server 300, which in turn registers the information.

The authentication processing unit 158 performs a process for user authentication, which is performed by the translation server 300. In the present embodiment, in advance of using the translation service, a user performs login operation from the operation unit 20. For example, when a user performs an operation (which may be clicking a login button displayed on the operation panel 27, for example), which triggers login, the login screen is displayed on the operation panel 27. When login information (i.e., information necessary for logging in) is entered by the user, the authentication processing unit 158 instructs the communication control unit 162 to transmit the entered login information to the translation server 300. Upon being instructed as such, the communication control unit 162 transmits the entered login information to the translation server 300, which in turn verifies the login information for user authentication.

When input representing the read instruction is accepted by the input accepting unit 154, the reading unit 160 reads image information by scanning a placed original. Even while the translation server 300 is translating partial image information transmitted to the translation server 300, the reading unit 160 reads image information by scanning the original.

When input representing the cancellation instruction is accepted by the input accepting unit 154, the reading unit 160 discontinues reading image information by stopping scanning the original.

The communication control unit 162 carries out communication with the translation server 300 and corresponds to "transmitter" and "receiver". More specifically, the communication control unit 162 transmits the user registration information accepted by the input accepting unit 154 to the translation server 300. The translation server 300 registers user's account according to the user registration information. The communication control unit 162 also transmits the login information accepted by the input accepting unit 154 to the translation server 300.

At a point in time when the reading unit 160 completes reading image information (partial image information) from one page or multiple pages of the original, the communication control unit 162 transmits the thus-read partial image information and the translation settings accepted by the input accepting unit 154 to the translation server 300 to request the translation server 300 to perform the translation process. Note that the partial image information may be image information read from a predetermined number, which is determined in the MFP 100, of pages or from a user-defined number, which is set from the settings screen or the like, of pages.

When reading image information of all the pages of the original by the reading unit 160 is completed, the communication control unit 162 transmits the reading-completed image information and the translation settings to the translation server 300 to request the translation server 300 to perform the translation process.

The communication control unit 162 further receives, from the translation server 300, translated information (partial translated information) obtained by translating source text information contained in the transmitted partial image information of the one or multiple pages in accordance with the translation settings transmitted together with the partial image information. The communication control unit 162 also receives, from the translation server 300, translated information obtained by translating source text information contained in the reading-completed image information in accordance with the translation settings.

The print control unit 164 prints the partial translated information received by the communication control unit 162 on a recording medium such as paper. The print control unit 164 also prints the translated information received by the communication control unit 162 on a recording medium. The print control unit 164 corresponds to "output unit".

The storage unit 170 is, for example, the ROM 12 or the HDD 14 and stores therein screen information, which is information about the various screens. The display control unit 152 obtains the screen information and displays the various screens.

Figure 5:
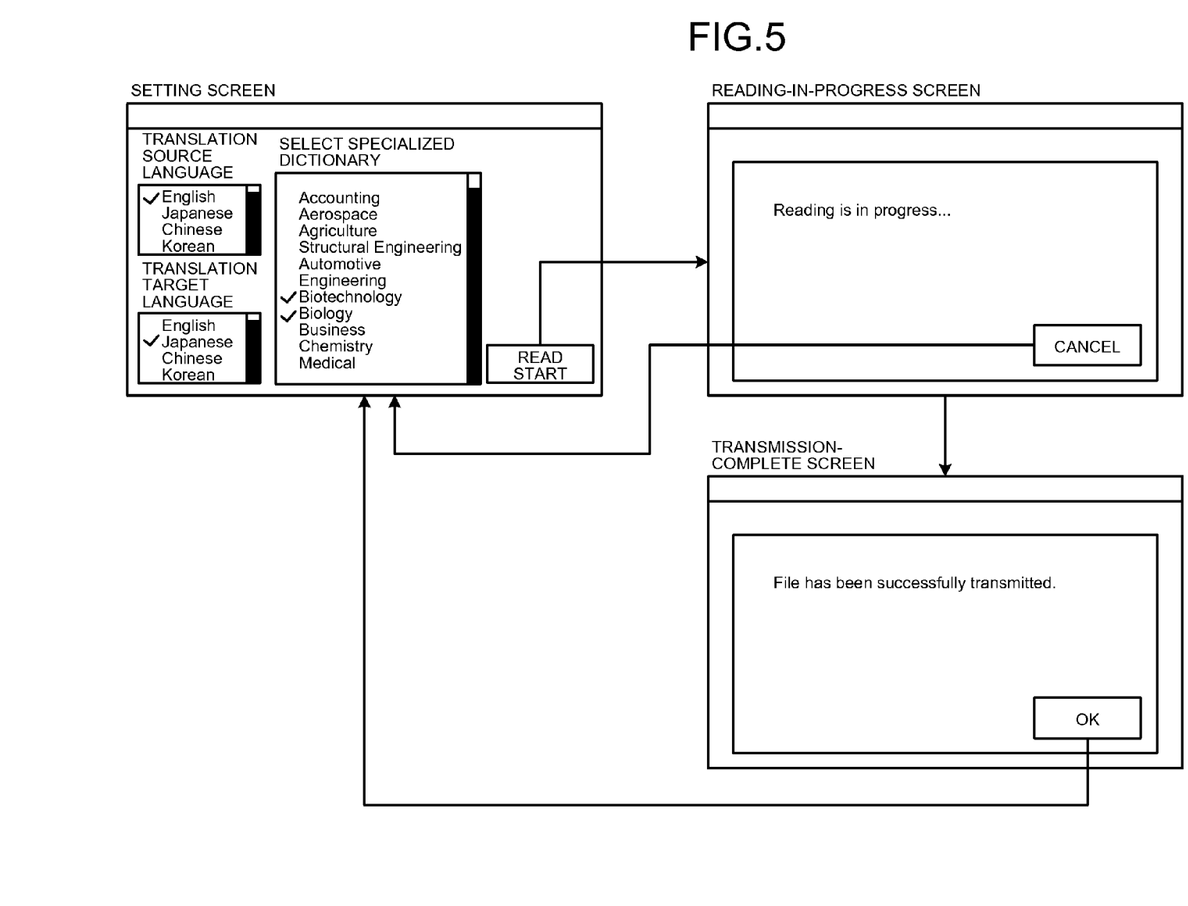
FIG. 5 is a schematic diagram illustrating an example of transition among various screens of a translation App according to the embodiment.

Transition among the various screens (i.e., the settings screen, the reading-in-progress screen, and the transmission-complete screen) of the translation App 50 is described below. FIG. 5 is a schematic diagram illustrating an example of transition among the various screens of the translation App according to the embodiment. When the translation App 50 is logged into by a user, the display control unit 152 displays the settings screen illustrated in FIG. 5 on the operation panel 27. As illustrated in FIG. 5, a plurality of translation source languages, a plurality of translation target languages, and a plurality of special fields are displayed on the settings screen such that selection therefrom can be made by user operation. After the login, the input accepting unit 154 receives input about translation settings from the user or, more specifically, input designating a translation source language, a translation target language, and optionally one or more specialized dictionaries (hereinafter, simply referred to as "specialized dictionary") from the settings screen.

After the translation settings entered from the settings screen are accepted, an original is placed by the user at a predetermined position on the MFP 100. When the "READ START" button on the settings screen is clicked, the reading unit 160 starts reading by scanning the original. During the reading, the display control unit 152 displays the reading-in-progress screen illustrated in FIG. 5 on the operation panel 27. For example, as illustrated in FIG. 5, the text "Reading is in progress . . . " indicating that the original is being read is displayed on the reading-in-progress screen.

When transmission of reading-completed image information and the translation settings to the translation server 300 is completed by the communication control unit 162, the display control unit 152 displays the transmission-complete screen illustrated in FIG. 5 on the operation panel 27. For example, as illustrated in FIG. 5, the text "File has been successfully transmitted." indicating that the image information and the like have been transmitted is displayed on the transmission-complete screen. When the "OK" button on the transmission-complete screen is clicked, the display control unit 152 displays the settings screen on the operation panel 27 again.

If the "CANCEL" button on the reading-in-progress screen is clicked during while the reading-in-progress screen is displayed, the reading unit 160 stops scanning the original, and the display control unit 152 displays the settings screen on the operation panel 27 again as is described above.

Figure 6:
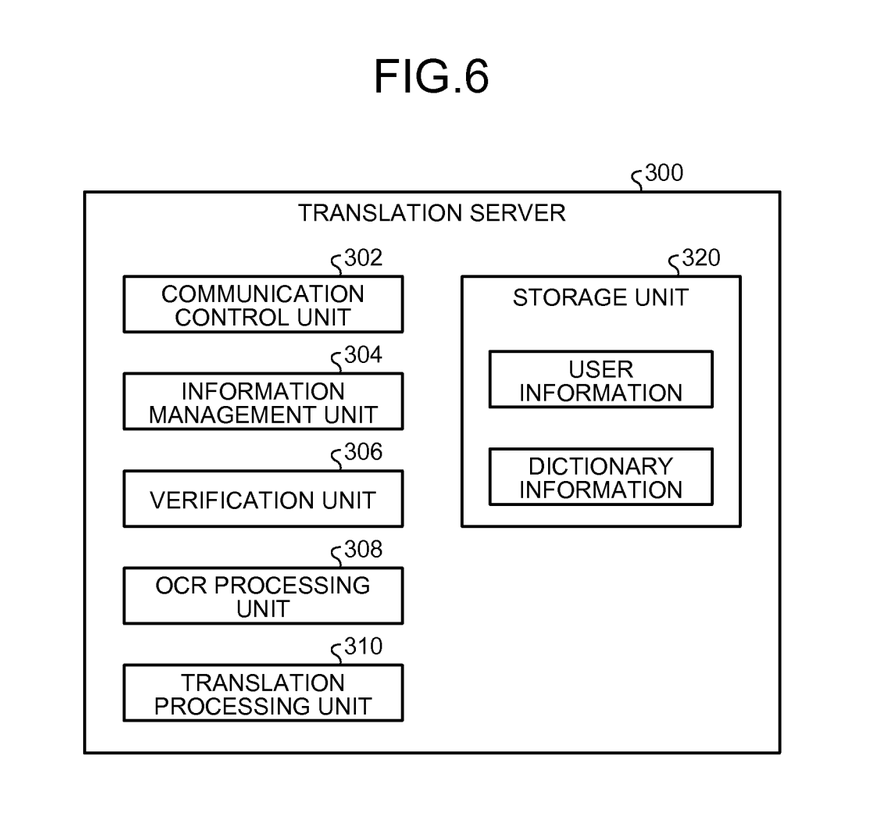
FIG. 6 is a diagram illustrating an example of functional configuration of a translation server according to the embodiment.

An example functional configuration of the translation server 300 is described below. FIG. 6 is a diagram illustrating an example of functional configuration of the translation server according to the embodiment. As illustrated in FIG. 6, the translation server 300 includes a storage unit 320, a communication control unit 302, an information management unit 304, a verification unit 306, an OCR (optical character recognition) processing unit 308, and a translation processing unit 310.

Figure 7:
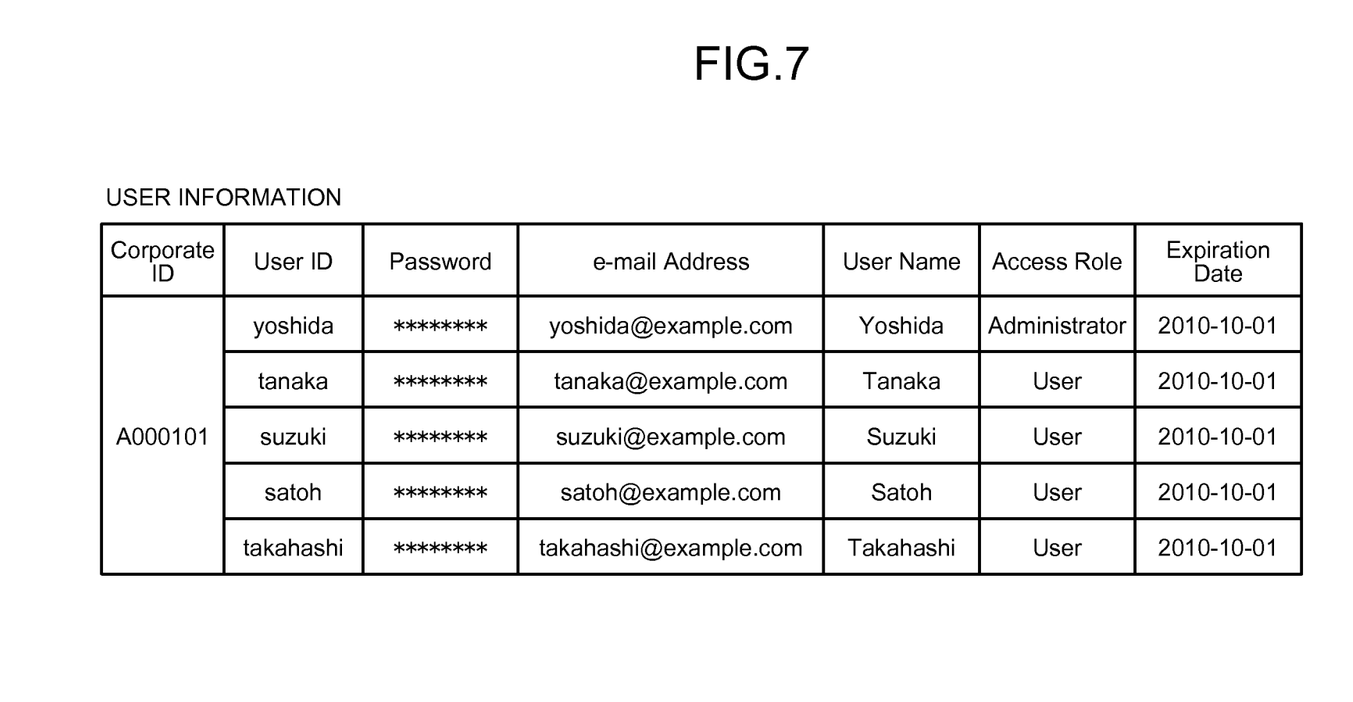
FIG. 7 is a diagram illustrating an example of user information stored in the translation server according to the embodiment.

The storage unit 320 stores therein user information and dictionary information. The user information is user registration information entered by one or more users on the MFP 100. FIG. 7 is a diagram illustrating an example of the user information stored in the translation server 300 according to the embodiment. As illustrated in FIG. 7, corporate ID (e.g., "A000101") for identification of each corporate, user IDs (e.g., "yoshida") for identification of each user, e-mail addresses (e.g., "yoshida@example.com"), user names (e.g., "Yoshida"), access roles (e.g., "Administrator") each indicating an authority level, and registration expiration date (e.g., "Oct. 1, 2020"), which are associated with each other, are registered on the user information.

For example, a user may perform account registration for the translation service by transmitting user registration information from the MFP 100 to the translation server 300 via an account-registration Web page. After the account is successfully registered, the user can log into the translation App 50 by entering login information which may be, for example, "corporate ID, user ID, and password" or "e-mail address and password".

As illustrated in the configuration example of the user information in FIG. 7, in the present embodiment, the translation service is provided in the following form. Corporate IDs are assigned on a per-corporate (or per-organization) basis. A corporate ID administrator(s) in each of the corporates, to which corporate ID is assigned, manages user IDs of users belonging to the corporate. However, the form of providing the translation service is not limited thereto. Alternatively, the translation service may be provided by identifying each user only by user ID or e-mail address without assigning corporate IDs.

The dictionary information is dictionaries to be used in the translation process. In the present embodiment, dictionaries of such special fields, e.g., accounting, aerospace, agriculture, and structural engineering, as those illustrated in FIG. 5 are stored.

The communication control unit 302 carries out communication with the MFP 100. More specifically, the communication control unit 302 receives user registration information from the MFP 100. The communication control unit 302 also receives login information and transmits a result of verification of the received login information (i.e., whether or not the login information is verified) performed by the verification unit 306 to the MFP 100.

The communication control unit 302 also receives, from the MFP 100, partial image information read from a part of an original or reading-completed image information read from all pages of the original. The communication control unit 302 transmits, to the MFP 100, partial translated information obtained by the translation processing unit 310 by performing the translation process on the partial image information or translated information obtained by the same by performing the translation process on the reading-completed image information.

The information management unit 304 manages the user information and the dictionary information in the storage unit 320. More specifically, the information management unit 304 registers the user registration information received by the communication control unit 302 on the user information in the storage unit 320. When update information for the user information or the dictionary information is given, the information management unit 304 updates the user information or the dictionary information in the storage unit 320.

The verification unit 306 performs verification for user authentication by comparing the login information received by the communication control unit 302 against the user information stored in the storage unit 320. More specifically, the verification unit 306 determines whether or not the received login information exists in the user information. If the login information exists in the user information, the verification unit 306 determines that the login information is verified, but determines that the login information is not verified otherwise.

The OCR processing unit 308 performs the character recognition process (more specifically, OCR process) on the partial image information and the reading-completed image information received by the communication control unit 302, thereby obtaining source text information to be subjected to translation. In the present embodiment, the OCR process is used as the character recognition process; however, the character recognition process is not limited thereto. Any one of various known techniques, with which source text information can be obtained from image information, can be used.

The translation processing unit 310 performs the translation process on the source text information obtained by the OCR processing unit 308 in accordance with the received translation settings and using the dictionary information stored in the storage unit 320, thereby creating translated information. More specifically, the translation processing unit 310 obtains the specialized dictionary designated by the translation settings from the dictionary information stored in the storage unit 320. The translation processing unit 310 creates the translated information by translating the source text information described in the translation source language designated by the translation settings into the translation target language designated by the translation settings using the obtained specialized dictionary. When the source text information to be translated is obtained from partial image information, the translation processing unit 310 creates partial translated information.

Figure 8:
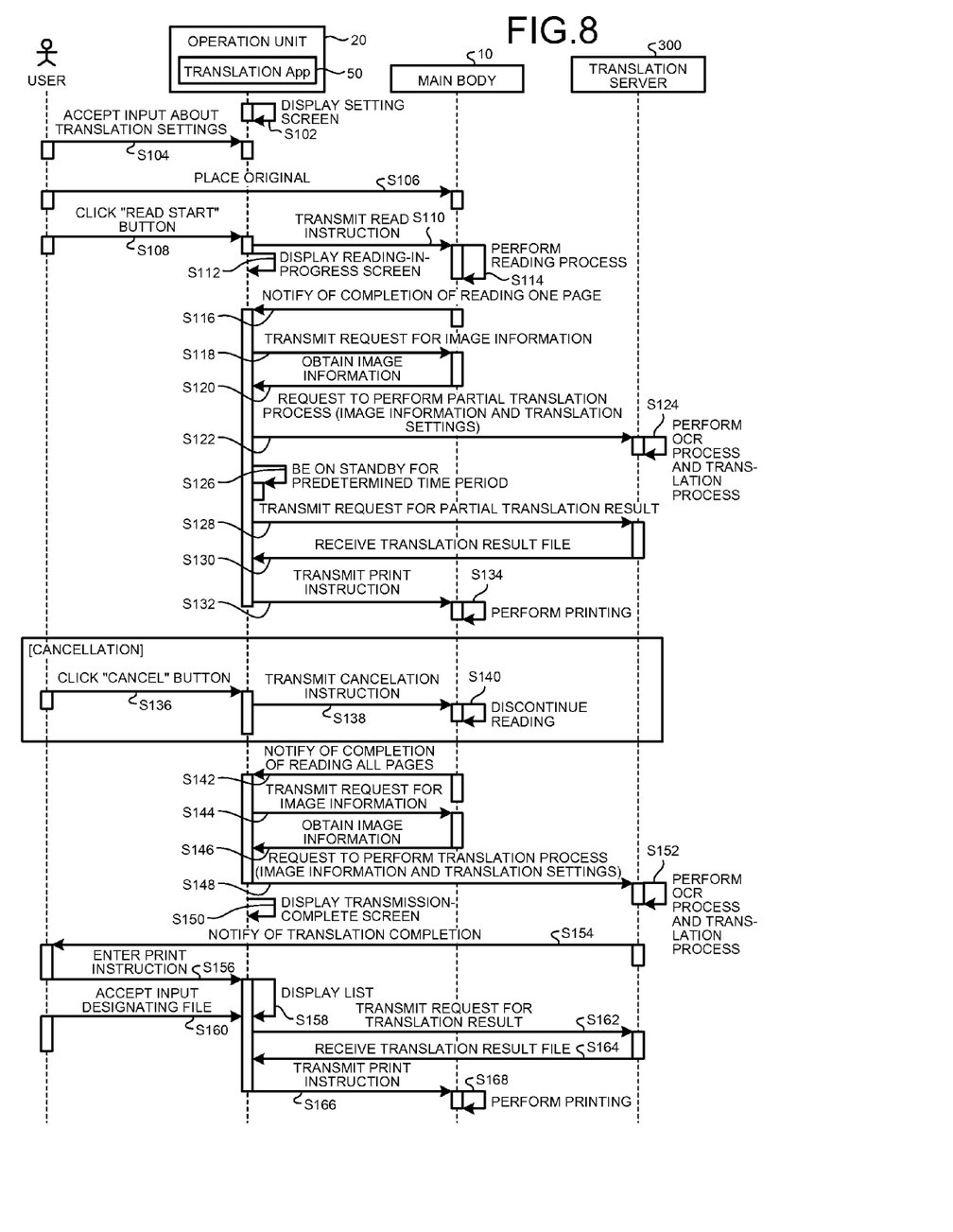
FIG. 8 is a flowchart for a translation service process according to the embodiment.

A translation service process performed by the translation system 1 according to the present embodiment is described below. FIG. 8 is a flowchart for the translation service process according to the embodiment. With reference to FIG. 8, a process to be performed after login of a user who desires to use the translation service is described.

When the user has completed logging in, the display control unit 152 displays the settings screen, from which the translation settings can be performed, on the operation panel 27 (step S102). The input accepting unit 154 accepts user input about translation settings from the settings screen (step S104).

When an original to be translated is placed by the user (step S106) and the "READ START" button on the settings screen is clicked (step S108), the reading unit 160 transmits an instruction to read the original to the main body 10 (step S110). The display control unit 152 displays the reading-in-progress screen on the operation panel 27 (step S112).

In accordance with the instruction from the reading unit 160, the main body 10 performs a reading process of reading image information by scanning the original (step S114). Each time the reading unit 160 completes reading one page of the original, the reading unit 160 transmits a notice of completion of reading one page to the translation App 50 (step S116).

Upon receiving a notice of completion of reading one page or a predetermined number of pages, the translation App 50 transmits a request for image information (partial image information) read by the main body 10 until this point in time to the main body 10 (step S118), and obtains the partial image information (step S120).

When the partial image information is obtained by the translation App 50, the communication control unit 162 transmits the obtained partial image information and the accepted translation settings to the translation server 300 to request the translation server 300 to perform a partial translation process (i.e., a process of translating the partial image information) (step S122).

In the translation server 300, which is requested to perform the partial translation process, the communication control unit 302 receives the partial image information and the translation settings. The OCR processing unit 308 obtains source text information by performing the OCR process on the partial image information. The translation processing unit 310 creates translated information by translating the obtained source text information into the translation target language by using the specialized dictionary designated by the translation settings (step S124).

After the translation App 50 is put on standby a predetermined time period (step S126), the communication control unit 162 transmits a request for a result of the partial translation to the translation server 300 (step S128) and receives a translation result file containing partial translated information (step S130). If the translation process is not completed yet, the translation server 300 responds to the request by transmitting a notice that the process is not completed yet. Thereafter, if the translation process is completed when the same request is received again, the translation server 300 transmits the translation result file.

When the translation result file is received from the translation server 300, the print control unit 164 transmits a print instruction to the main body 10 (step S132). The main body 10 prints the partial translated information on a recording medium such as paper (step S134).

The procedure described above enables a user to check quality of the translation result in the form of the partial translated information obtained from the partial image information read until then, thereby eliminating the need of waiting for the translation system 1 to complete the whole translation process from the user. Note that the MFP 100 is performing the reading process of reading the original even while the MFP 100 is printing the translated information received in response to the request for the translation process. Although FIG. 8 illustrates a configuration, in which quality check is performed using a printout produced by printing the partial translated information on paper, alternatively, a configuration, in which quality check is performed using the translated information displayed on the operation panel 27, may be adopted.

If the user who views the printed partial translated information determines that quality of the translation is unsatisfactory, the user can click the "CANCEL" button on the reading-in-progress screen, thereby issuing an instruction to cancel the original reading process.

If the "CANCEL" button is clicked by the user (step S136), the reading unit 160 transmits the instruction to cancel the reading process of reading the original to the main body 10 (step S138), in response to which the main body 10 discontinues the original reading process (step S140). When the original reading process is canceled, the display control unit 152 displays the settings screen on the operation panel 27, so that the user can immediately start over configuring the translation settings.

If the MFP 100 completes the reading process of reading all the pages of the original without receiving the cancellation instruction instructing to cancel the reading process from the user, the main body 10 transmits a notice of completion of reading all the pages to the translation App 50 (step S142). Upon receiving the notice of completion of reading all the pages, the translation App 50 transmits a request for image information, reading of which by the main body 10 is completed, to the main body 10 (step S144), and obtains the image information (step S146).

When the image information is obtained by the translation App 50, the communication control unit 162 transmits the obtained image information and the accepted translation settings to the translation server 300 and requests the translation server 300 to perform a translation process (i.e., a process of translating the image information of all the pages of the original) (step S148).

When the translation server 300 is requested to perform the translation process, the display control unit 152 displays the transmission-complete screen indicating that the reading-completed image information has been transmitted on the operation panel 27 (step S150). When the "OK" button on the transmission-complete screen is clicked by the user, the display control unit 152 displays the settings screen on the operation panel 27 again, so that the user can request another translation job.

In the translation server 300, which is requested to perform the translation process, the communication control unit 302 receives the image information and the translation settings. The OCR processing unit 308 obtains source text information from the image information by performing the OCR process thereon. The translation processing unit 310 creates translated information by translating the obtained source text information into the translation target language using the specialized dictionary designated by the translation settings (step S152).

When the translation process is completed, the communication control unit 302 transmits a translation completion notice to the e-mail address registered on the user information (step S154). When the user who receives the translation completion notice desires to print the translated information, the user starts the translation App 50 on the MFP 100 again and enters input representing a print instruction (step S156).

When the entered print instruction is accepted by the input accepting unit 154, the display control unit 152 displays a list of printable translation result files on the operation panel 27 (step S158). When input designating a translation result file, printing of which is desired by the user, is accepted by the input accepting unit 154 (step S160), the communication control unit 162 transmits a request for the translation result to the translation server 300 (step S162) and receives the translation result file containing the translated information (step S164).

When the translation result file is received from the translation server 300, the print control unit 164 transmits the print instruction to the main body 10 (step S166). The main body 10 prints the translated information on a recording medium such as paper (step S168).

In the above description, the user who receives the translation completion notice starts the translation App 50 on the MFP 100 again to enter the print instruction. Alternatively, a configuration, in which the user downloads the translation result file on an information processing apparatus such as a PC and delivers the print instruction to the MFP 100 from the PC, may be adopted.

As described above, in the translation system 1 according to the present embodiment, the MFP 100 receives partial translated information from the translation server 300 at a point in time when a part of a translation process is completed. The MFP 100 prints the received partial translated information while continuing the process of reading an original. Accordingly, a user can check quality of a result of in-progress translation (before completion of the translation process).

Quality of translation result can vary depending on which specialized dictionary is designated by a user. Because there is an upper limit on the number of selectable specialized dictionaries, when an original to be translated covers a plurality of special fields, a situation, in which an appropriate combination of specialized dictionaries is not obvious to the user, can arise. However, in the translation system 1 according to the present embodiment, before completion of the reading process of reading image information from an original, a user can check quality of a translation result having been translated until then and, if the user determines that the translation is unsatisfactory, the user can issue a cancellation instruction immediately and start over configuring the translation settings for selecting one or more specialized dictionaries. This configuration can shorten a time lapse before the user finds an optimum combination of the specialized dictionaries, thereby shortening a time lapse before the original is translated using the optimum combination of the specialized dictionaries.

Meanwhile, the translation system 1 according to the present embodiment is configured such that, before completion of a translation process, partial translated information is printed one time for quality check of a result of in-progress translation; thereafter, translated information obtained from all the pages of the original is printed on a recording medium. However, the configuration of the translation system 1 is not limited thereto. For example, the translation system 1 may be configured to print partial translated information a plurality of times such that, for example, each time partial translated information obtained by translating different pages is printed to be subjected to quality check of translation result before completion of the translation process. More specifically, the translation system 1 may be configured to enable quality check of translation result in the following multi-stage manner: when an original containing 100 pages is given, translated information (i.e., partial translated information) obtained from the 1st to 10th pages of the original is printed and subjected to quality check of translation result; translated information obtained from the 11th to 20th pages is printed and subjected to quality check of translation result; and translated information obtained from the 21st to 30th pages is printed and subjected to quality check of translation result. In this configuration, the number of pages of the partial translated information to be printed at each of the plurality of times is not necessary uniform but may vary. For example, the translation system 1 may be configured to print translated information obtained from the 1st to 20th pages first, and thereafter print translated information obtained from the 21st to 25th pages for quality check of translation result. This configuration enables a user to check quality of a result of translating an original, part by part, over a plurality of times before completion of a translation process.

In the MFP 100 described above, functions of the units (the display control unit 152, the input accepting unit 154, the registration processing unit 156, the authentication processing unit 158, the reading unit 160, the communication control unit 162, and the print control unit 164) are provided by the CPU 11 or the CPU 21 by executing program stored in a storage device (e.g., the ROM 12, the HDD 14, the ROM 22, or the flash memory 24). However, the functions may be provided otherwise. For example, at least a part of the functions of the above-described units of the MFP 100 may be implemented in dedicated hardware circuit (e.g., a semiconductor integrated circuit).

The above-described units may alternatively be implemented in the HDD 14 or the like of the main body 10 or, alternatively, implemented in the flash memory 24 or the like of the operation unit 20, for example.

In the embodiment described above, the main body 10 and the operation unit 20 operate on different operating systems independently of each other. However, the operating form of the main body 10 and the operation unit 20 is not limited thereto. For example, a form, in which the main body 10 and the operation unit 20 operate on the same operating system, may alternatively be adopted.

The program to be executed by the MFP 100 of the embodiment described above may be configured to be provided as being recorded in a computer-readable recording medium such as a CD-ROM, an FD (flexible disk), a CD-R, a DVD (digital versatile disk), or a USB in an installable or executable format. Alternatively, the program may be configured to be provided or distributed over a network, such as the Internet. Further alternatively, the program may be configured to be provided as being installed on a non-volatile recording medium such as a ROM in advance.

The translation system 1 of the present embodiment is configured such that the translation server 300 performs the character recognition process (the OCR process) on image information. Alternatively, a configuration, in which the MFP 100 performs the character recognition process and transmits source text information obtained as a result to the translation server 300, may be adopted. The system may include two or more servers, by any one of which the functions may be provided. Meanwhile, the configuration of the system described in the embodiment, in which the MFP and the translation server are connected to each other, is only an example. Needless to say, the system configuration may vary variously depending on use and purpose.

Although the embodiment has been described by way of the example, in which the image processing apparatus according to aspects of the invention is applied to the MFP having at least two of the copying function, the printer function, the scanner function, and the facsimile function; however, the image processing apparatus is applicable to any image processing apparatus such as a copier or a printer.

According to an aspect of the present invention, it is possible to check quality of a result of in-progress translation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus connected over a network to an information processing apparatus, the information processing apparatus being configured to perform a translation process of translating source text information to be translated, the image forming apparatus comprising:
   a memory having computer readable instructions stored thereon; and
   at least one processor configured to execute the computer readable instructions to,
   read image information from an original document;
   transmit partial image information read from a part of the original document to the information processing apparatus at a point in time when the partial image information has been read, and
      translation settings obtained from a user, the translation settings selected from among a plurality of translation source languages and a plurality of translation target languages;
   receive, from the information processing apparatus, partial translated information obtained by translating source text information contained in the partial image information, the translating source text information based on the translation settings;
   output the received partial translated information;
   read the image information from the original document even while the partial image information is transmitted to the information processing apparatus; and
   when the reading the image information from the original has completed, the at least one processor is further configured to transmit the reading-completed image information to the information processing apparatus,
   wherein the at least one processor is further configured to perform the read the image information from the original document by,
   determining whether a desired number of pages of the original document has been read as the image information, and
   transmitting the partial image information to the information processing apparatus based on results of the determining.

2. The image forming apparatus according to claim 1, wherein the at least one processor is further configured to:
   print the partial translated information on a recording medium.

3. The image forming apparatus according to claim 1, further comprising:
   a display device, wherein
   the at least one processor is further configured to display the partial translated information on the display device.

4. The image forming apparatus according to claim 1, wherein the at least one processor is further configured to:
   receive user input related to a plurality of specialized dictionary settings;
   transmit, with the partial image information, the received specialized dictionary settings to the information processing apparatus; and
   receive the partial translate information translated in accordance with the received specialized dictionary settings.

5. The image forming apparatus according to claim 4, wherein the specialized dictionary settings include:
   a plurality of dictionaries to be utilized in translating the source text information.

6. The image forming apparatus according to claim 1, wherein the at least one processor is further configured to:
receive input representing a cancellation instruction instructing to discontinue reading the image information from the original document; and
based on the received the cancellation instruction, discontinue reading the image information from the original document, wherein
the cancellation instruction is received after the partial translated information has been printed on a recording medium or is displayed on a display device.

7. An image forming method to be performed by an image forming apparatus connected over a network to an information processing apparatus, the information processing apparatus being configured to translate source text information to be translated, the image forming method comprising:
reading image information from an original document;
transmitting partial image information read from a part of the original document to the information processing apparatus at a point in time when the partial image information has been read, and
translation settings obtained from a user, the translation settings selected from among a plurality of translation source languages and a plurality of translation target languages;
receiving, from the information processing apparatus, partial translated information obtained by translating source text information contained in the partial image information, the translating source text information based on the translation settings; and
outputting the received partial translated information, wherein,
the reading further includes, reading the image information from the original document even while the partial image information is transmitted to the information processing apparatus,
determining whether a desired number of pages of the original document has been read as the image information, and
transmitting the partial image information to the information processing apparatus based on results of the determining, and
the transmitting further includes, when reading the image information from the original is completed, transmitting the reading-completed image information to the information processing apparatus.

8. A translation system comprising:
an information processing apparatus; and
an image forming apparatus connected to the information processing apparatus over a network,
the image forming apparatus including,
a scanner configured to read image information from an original document, and
a transmitter configured to transmit partial image information read from a part of the original document to the information processing apparatus at a point in time when the partial image information has been read, and
translation settings obtained from a user, the translation settings selected from among a plurality of translation source languages and a plurality of translation target languages;
the information processing apparatus including,
a memory having computer readable instructions stored thereon, and
at least one processor configured to execute the computer readable instructions to,
receive the partial image information from the image forming apparatus, and
perform a translation process on source text information to be translated, the source text information being contained in the partial image information, thereby creating partial translated information, the translation process based on the translation settings,
transmit the created partial translated information to the image forming apparatus; and
the image forming apparatus further including,
a receiver configured to receive the partial translated information from the information processing apparatus, and
an output device configured to output the received partial translated information, wherein
the scanner is configured to continue to read the image information from the original document even while the partial image information is transmitted to the information processing apparatus, and
when the scanner has completed reading the image information from the original, the transmitter is configured to transmit the reading-completed image information to the information processing apparatus; and
the scanner is further configured to perform the read the image information from the original document by,
determining whether a desired number of pages of the original document has been read as the image information, and
the transmitter is further configured to transmit the partial image information to the information processing apparatus based on results of the determining.

9. The image forming apparatus according to claim 1, wherein the at least one processor is further configured to perform the transmit the partial image information to the information processing apparatus by:
transmitting a request to the information processing apparatus for a partial translation result; and
receiving a status update on the partial translation result from the information processing apparatus or the received partial translated information.

10. The image forming apparatus according to claim 1, wherein the at least one processor is further configured to:
notify the user when the partial translated information is received.

11. The image forming method according to claim 7, further comprising:
receiving input representing a cancellation instruction instructing to discontinue reading the image information from the original document; and
based on the received the cancellation instruction, discontinuing the reading of the image information from the original document, wherein
the cancellation instruction is received after the partial translated information has been printed on a recording medium or is displayed on a display device.

12. The image forming method according to claim 7, further comprising:
transmitting a request to the information processing apparatus for a partial translation result; and
receiving a status update on the partial translation result from the information processing apparatus or the received partial translated information.

13. The translation system according to claim 8, wherein the scanner is further configured to:

receive input representing a cancellation instruction instructing to discontinue reading the image information from the original document; and based on the received the cancellation instruction, discontinue reading the image information from the original document, wherein the cancellation instruction is received after the partial translated information has been printed on a recording medium or is displayed on a display device.

14. The translation system according to claim 8, wherein the transmitter is further configured to perform the transmit the partial image information to the information processing apparatus by:

transmitting a request to the information processing apparatus for a partial translation result; and the receiver is configured to receive a status update on the partial translation result from the information processing apparatus or the received partial translated information.

15. The image forming method according to claim 7, further comprising:

printing the partial translated information on a recording medium.

16. The image forming method according to claim 7, further comprising:

displaying the partial translated information on a display device.

17. The image forming method according to claim 7, further comprising:

receiving user input related to a plurality of specialized dictionary settings;

transmitting, with the partial image information, the received specialized dictionary settings to the information processing apparatus; and receiving the partial translate information translated in accordance with the received specialized dictionary settings.

18. The translation system according to claim 8, wherein the output device is further configured to:

print the partial translated information on a recording medium.

19. The translation system according to claim 8, wherein the output device is further configured to:

display the partial translated information.

20. The translation system according to claim 8, wherein the transmitter is configured to receive user input related to a plurality of specialized dictionary settings, and transmit, with the partial image information, the received specialized dictionary settings to the information processing apparatus; and the receiver is configured to receive the partial translate information translated in accordance with the received specialized dictionary settings.

* * * * *